(12) United States Patent
Akita et al.

(10) Patent No.: US 8,175,558 B2
(45) Date of Patent: May 8, 2012

(54) RADIO COMMUNICATION APPARATUS AND METHOD

(76) Inventors: Koji Akita, Yokohama (JP); Tazuko Tomioka, Kawasaki (JP)

( * ) Notice: Subject to any disclaimer, the term of this patent is extended or adjusted under 35 U.S.C. 154(b) by 535 days.

(21) Appl. No.: 12/396,190

(22) Filed: Mar. 2, 2009

(65) Prior Publication Data

US 2009/0239482 A1    Sep. 24, 2009

(30) Foreign Application Priority Data

Mar. 18, 2008  (JP) ................................. 2008-070041

(51) Int. Cl.
*H04B 7/08* (2006.01)
(52) U.S. Cl. ........................................................ 455/132
(58) Field of Classification Search .................. None
See application file for complete search history.

(56) References Cited

U.S. PATENT DOCUMENTS

| 7,489,958 | B2 * | 2/2009 | Diab et al. ............... 600/322 |
| 2008/0186087 | A1 * | 8/2008 | Chang ...................... 327/551 |

OTHER PUBLICATIONS

Shetty, et al., "Detect and Avoid (DAA) Techniques—Enabler for Worldwide Ultrawideband Regulations", Mar. 3, 2007, The Institution of Engineering and Technology Antenna & Propagation Network, Staccato Communications, pp. 23-29.

* cited by examiner

*Primary Examiner* — Lincoln Donovan
*Assistant Examiner* — Sibin Chen
(74) *Attorney, Agent, or Firm* — Ohlandt, Greeley, Ruggiero & Perle, L.L.P.

(57) ABSTRACT

A radio communication apparatus includes a first acquisition unit configured to acquire a first frequency use status of a first frequency band having a first center frequency, a second acquisition unit configured to acquire a second frequency use status of a second frequency band having a second center frequency which is a value M/N times (M and N are natural numbers, and M≠N) of the first center frequency, and a decision unit configured to determine whether a harmonic is detected in the first frequency band using the first frequency use status and the second frequency use status, and to decide, if it is determined that the harmonic is detected, a radio communication parameter in the first frequency band so as to use a frequency band used by the harmonic in radio communication.

28 Claims, 12 Drawing Sheets

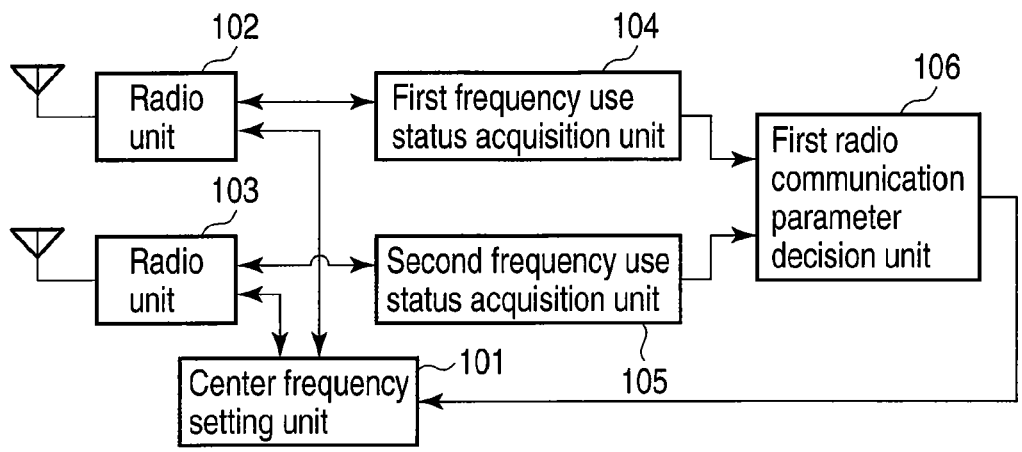
F I G. 1
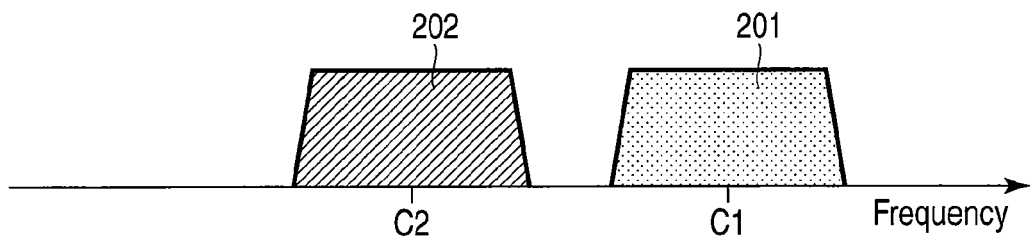
F I G. 2
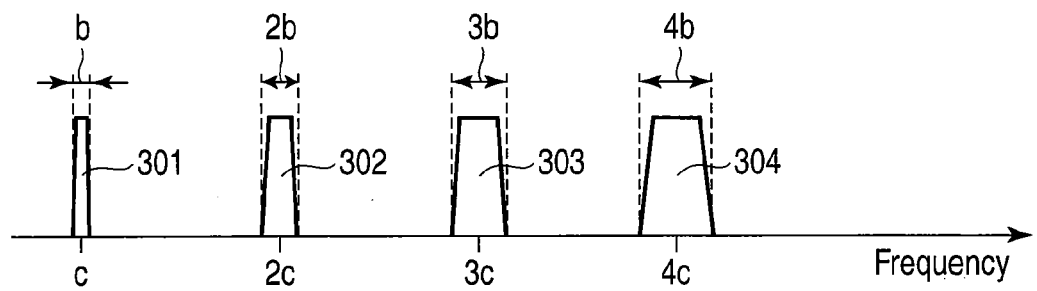
F I G. 3

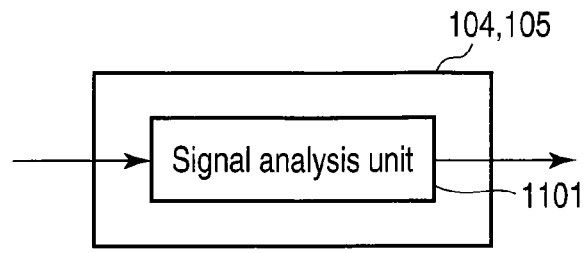
F I G. 1 1
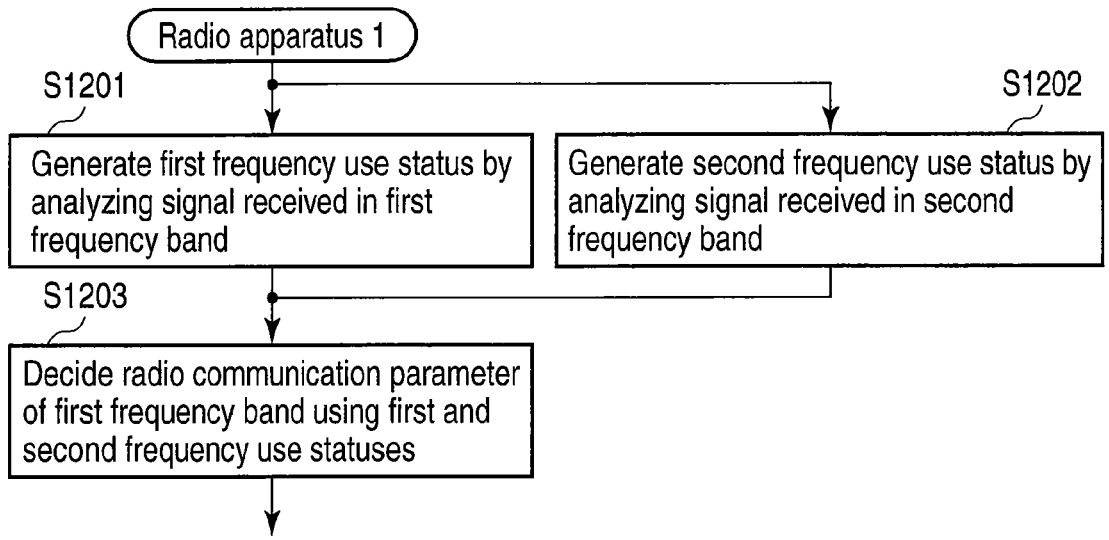
F I G. 1 2
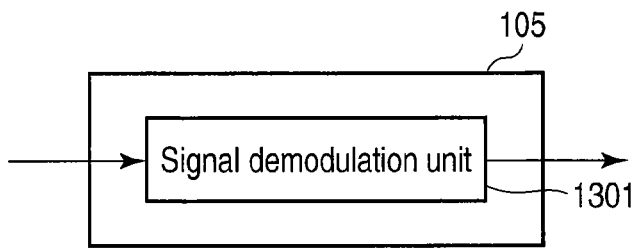
F I G. 1 3

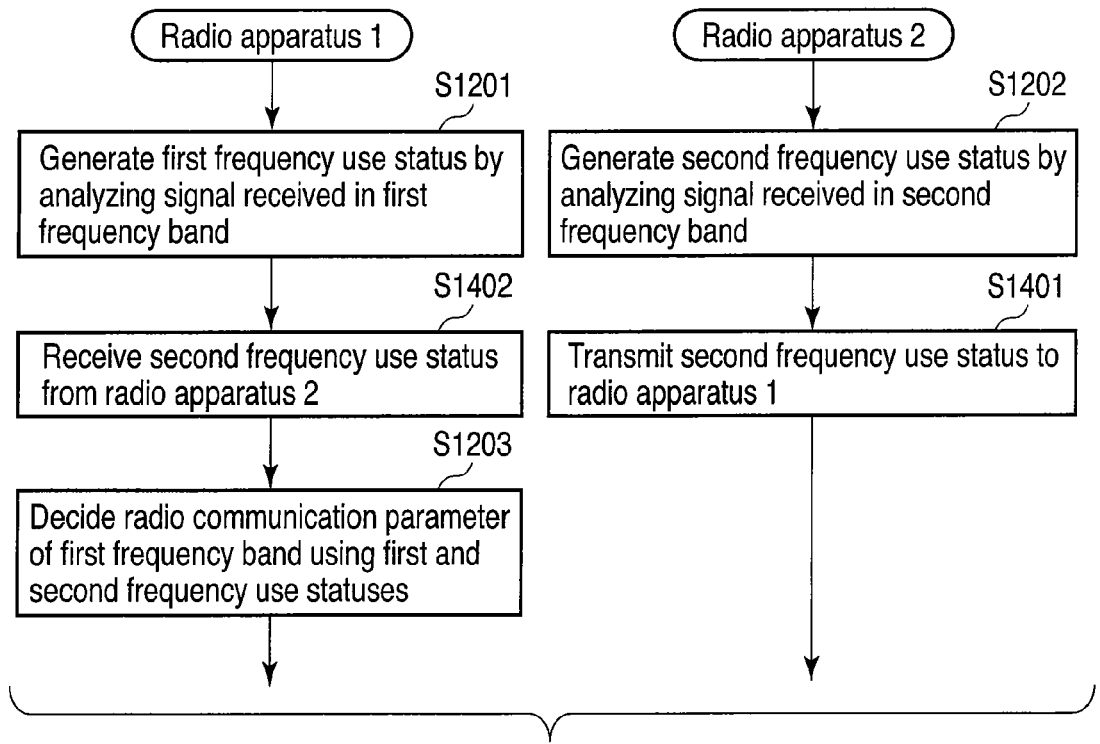
F I G. 1 4
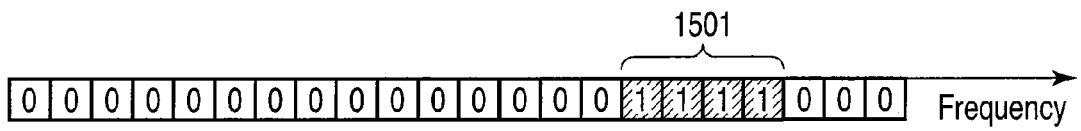
F I G. 1 5
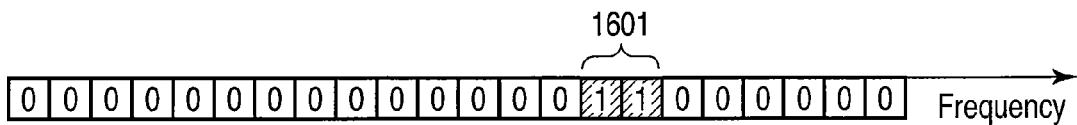
F I G. 1 6

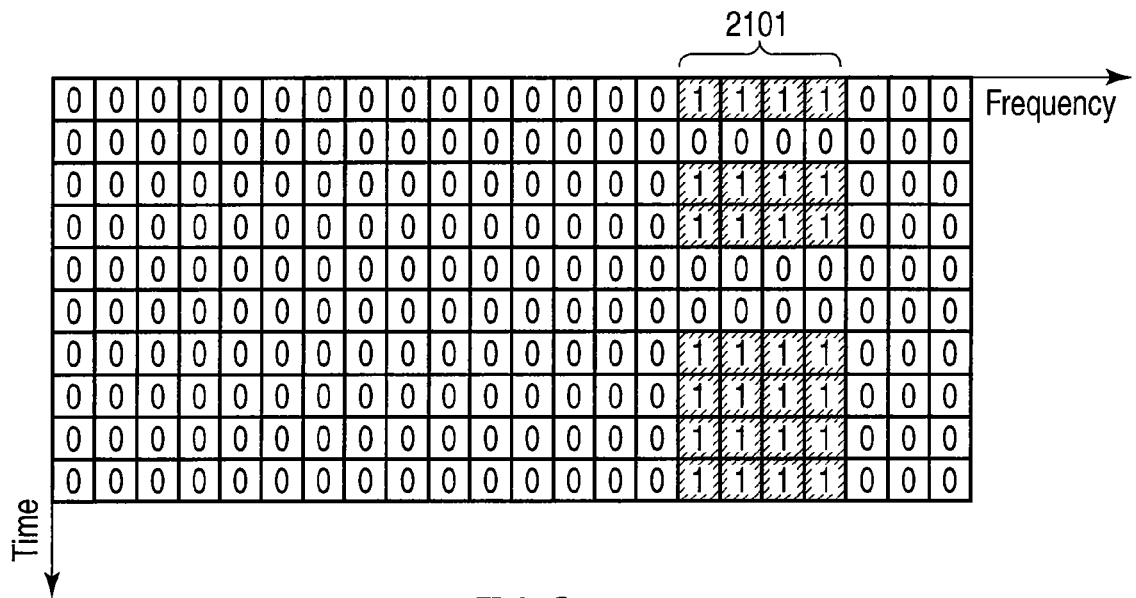
F I G. 2 1
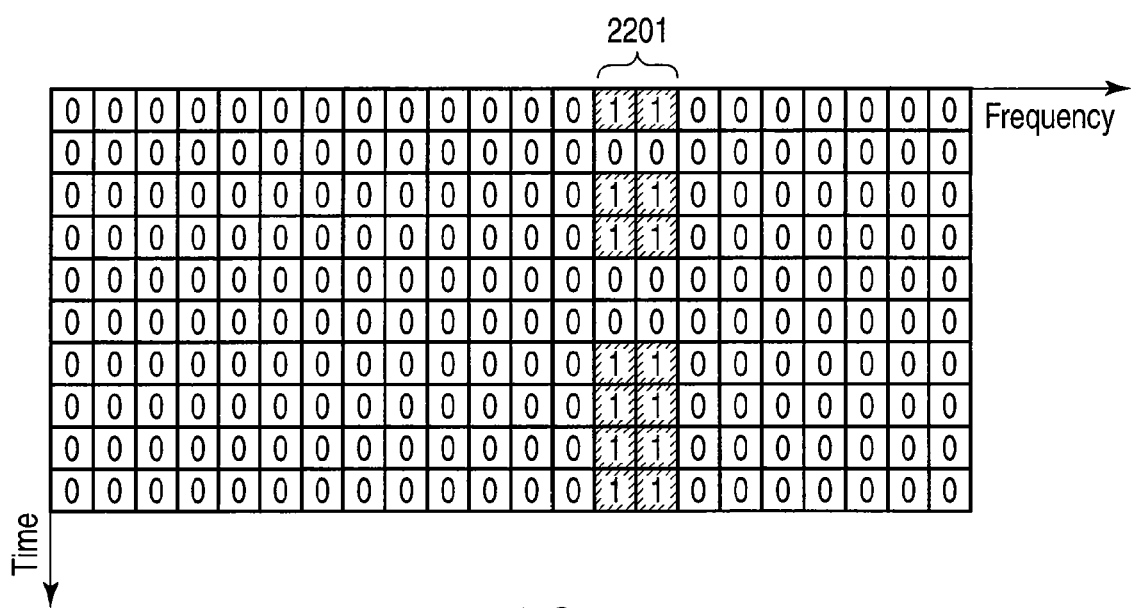
F I G. 2 2

RADIO COMMUNICATION APPARATUS AND METHOD

CROSS-REFERENCE TO RELATED APPLICATIONS

This application is based upon and claims the benefit of priority from prior Japanese Patent Application No. 2008-070041, filed Mar. 18, 2008, the entire contents of which are incorporated herein by reference.

BACKGROUND OF THE INVENTION

1. Field of the Invention

The present invention relates to a radio communication apparatus and method associated with carrier sensing.

2. Description of the Related Art

A technique which executes carrier sensing within bands to be used in radio communication, and carries out radio communication using only a band which is not used is known (for example, see "Detect and Avoid [DAA] Techniques—Enabler For Worldwide Ultrawideband Regulations" Siddharth Shetty, Staccato Communications).

However, since the related art cannot determine that a detected signal is a harmonic, a frequency band including harmonics cannot be used in cognitive radio communication, resulting in low throughput.

BRIEF SUMMARY OF THE INVENTION

In accordance with an aspect of the invention, there is provided a radio communication apparatus comprising: a first acquisition unit configured to acquire a first frequency use status of a first frequency band having a first center frequency; a second acquisition unit configured to acquire a second frequency use status of a second frequency band having a second center frequency which is a value M/N times (M and N are natural numbers, and M≠N) of the first center frequency; and a decision unit configured to determine whether a harmonic is detected in the first frequency band using the first frequency use status and the second frequency use status, and to decide, if it is determined that the harmonic is detected, a radio communication parameter in the first frequency band so as to use a frequency band used by the harmonic in radio communication.

In accordance with another aspect of the invention, there is provided a radio communication apparatus comprising: a first acquisition unit configured to acquire a first frequency use status of a first frequency band having a first center frequency and a first bandwidth W1; a second acquisition unit configured to acquire a second frequency use status of a second frequency band having a second center frequency which falls within a range of ±MAX(0,(W2−W1×M/N)/2) using a value M/N times (M and N are natural numbers, and M≠N) of the first center frequency as a center, and having a second bandwidth W2; and a decision unit configured to determine whether a harmonic is detected in the first frequency band using the first frequency use status and the second frequency use status, and to decide, if it is determined that the harmonic is detected, a radio communication parameter in the first frequency band so as to use a frequency band used by the harmonic in radio communication.

BRIEF DESCRIPTION OF THE SEVERAL VIEWS OF THE DRAWING

FIG. 1 is a block diagram of a radio communication apparatus according to embodiments;

FIG. 2 is a view showing first and second frequency bands, the use statuses of which are examined by the radio communication apparatus;

FIG. 3 is a view showing a state in which the center frequencies and bands of harmonics change depending on the orders of harmonics;

FIG. 11 is a diagram showing the first example of the first frequency use status acquisition unit and a second frequency use status acquisition unit in FIG. 1;

FIG. 12 is a flowchart showing an example of the operation of a signal analysis unit in FIG. 11;

FIG. 13 is a diagram showing the second example of the first and second frequency use status acquisition units in FIG. 1;

FIG. 14 is a flowchart showing an example of the operation of a signal demodulation unit in FIG. 13;

FIGS. 15 to 24 are views for explaining the operation examples of a first radio communication parameter decision unit in FIG. 1;

DETAILED DESCRIPTION OF THE INVENTION

Figure 4:
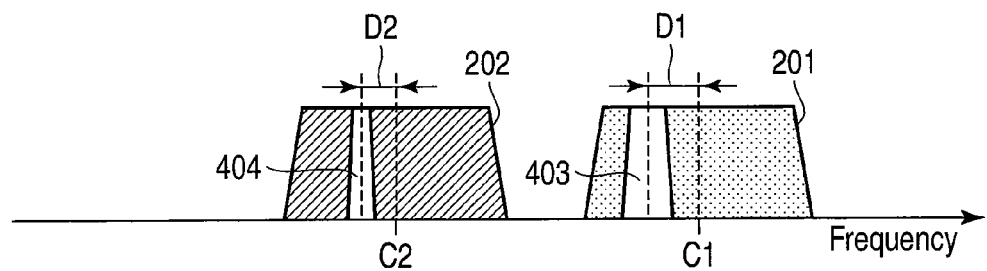
FIG. 4 is a view showing an example in which signals are detected in the first frequency band.

A radio communication apparatus and method according to embodiments of the present invention will be described in detail hereinafter with reference to the accompanying drawings. In the following embodiments, under the assumption that parts denoted by the same reference numbers perform the same operations, a repetitive description thereof will be avoided.

Problems and overview of the present invention will be briefly described.

(Problems and Overview of Invention)

To many radio communication systems, frequency bands used in communications are individually assigned. Such individual assignments are effective since any interference between radio communication systems can be avoided. However, a problem that limited frequency resources may not be efficiently used is pointed out. For example, since a certain radio communication system to which an individual frequency band is assigned is operated not in all times and geographical locations, this frequency band is not used in non-operating times and geographical locations, thus becoming a factor contributing to a low frequency use ratio.

In consideration of such situation, as a technique for improving the frequency use ratio, a technique called cognitive radio is beginning to be examined. As one study about cognitive radio, that about Detect and Avoid (DAA) has been made. DAA is a technique which detects an empty frequency band by observing the use statuses of frequencies, and sets radio communication parameters to avoid the occurrence of an empty frequency. In processing of detection executed in the DAA, there are two requirements. The first requirement is to precisely detect existing radio communication systems. The second requirement is to precisely detect that signals which are not existing radio communicate systems, e.g., mere noise signals, are not existing radio communication systems.

The first requirement is needed for cognitive radio not to interfere with existing radio communication systems. On the other hand, the second requirement is needed to improve the throughput of cognitive radio. These requirements will be described in more detail below.

As one method used in the processing of detection, a method based on a received power value is known. With this method, a received signal power for each frequency band is observed, and when this power becomes greater than or equal to a certain threshold, it is determined that an arbitrary radio signal is generated in that frequency band. When this method is used, the aforementioned first requirement can be met to some extent by appropriately setting the threshold.

However, the second requirement cannot often be sufficiently met. For example, various electronic devices which operate using clocks radiate harmonics of internal clocks as radio signals. Also, for example, when an existing radio communication system transmits a signal, harmonics of the signal to be transmitted are often transmitted together depending on the filter specifications of a transmitter. Furthermore, even when the filter specifications of the transmitter of the existing radio communication system are sufficient, harmonics of a received signal are often observed together due to nonlinearity of a radio unit in a cognitive radio apparatus which observes such transmission signal. These harmonics are not signals to which frequency bands are assigned as existing radio communication systems, but they have signal powers. For this reason, upon execution of the detection based on the signal powers, these harmonics are detected as signals from existing radio communication systems. As a result, frequency bands available for cognitive radio communication are reduced, and the throughput of cognitive radio communication decreases.

Hence, the embodiment provides means for determining if a detected signal is a harmonic, and can consequently improve the throughput of cognitive radio communication.

According to the radio communication apparatus and method of this embodiment, the throughput of cognitive radio communication can be improved.

A radio communication apparatus of this embodiment will be described below with reference to FIG. 1.

The radio communication apparatus of the embodiment includes a center frequency setting unit 101, radio units 102 and 103, first frequency use status acquisition unit 104, second frequency use status acquisition unit 105, and first radio communication parameter decision unit 106. In the first and second embodiments, the operation of the center frequency setting unit 101, i.e., the second center frequency setting method is different. The radio communication apparatus of the embodiment carries out radio communication using two frequency bands.

The center frequency setting unit 101 sets a value of a second center frequency as a center frequency of a second frequency band. After the first radio communication parameter decision unit 106 determines the presence/absence of harmonics using frequency use statuses, and settles the presence/absence of harmonics, the second center frequency may be changed to another value. In this case, for example, the second center frequency may be changed to a band including a smaller number of signals by existing radio communication systems.

In the first embodiment, the center frequency setting unit 101 sets the second center frequency to be a value M/N times (M and N are natural numbers, and M≠N) of a first center frequency. Details of this setting will be described later with reference to FIGS. 25 and 26. In the second embodiment, the center frequency setting unit 101 sets the second center frequency which falls within the range of ±MAX(0,(W2−W1× M/N)/2) using a value M/N times (M and N are natural numbers, and M≠N) of the first center frequency as the center. Details of this setting will be described later with reference to FIG. 25 in the second embodiment. Note that a description MAX(X, Y) represents that a larger value of X and Y is returned. If X≧Y, MAX(X, Y)=X; if Y≧X, MAX(X, Y)=Y.

The radio units 102 and 103 transmit signals to other radio communication apparatuses and receive signals from them using the first and second frequency bands. The radio units 102 and 103 exchange, for example, a first frequency status, second frequency status, and second center frequency change instruction signal.

The first frequency use status acquisition unit 104 checks if a signal is detected within the first frequency band. When a signal is detected, the unit 104 acquires a band in which the signal is detected, and acquires a frequency use status indicating the presence/absence of detection of signals in a plurality of bands included in the first frequency band. For example, in a band in which a signal power is greater than or equal to a threshold, it is determined that a signal is detected. The frequency use status may be a signal power value for each band. Also, a detection status of signals may be measured not only in the frequency direction in this way but also by delimiting into given time zones in the time direction. Details will be described later with reference to FIGS. 5 to 12.

The second frequency use status acquisition unit 105 is used for a frequency band different from the first frequency use status acquisition unit 104, and is the same as the first frequency use status acquisition unit 104 except for a target frequency band. Details will be described later with reference to FIGS. 5 to 14.

The first radio communication parameter decision unit 106 detects a harmonic included in the first frequency band using the first frequency use status acquired by the first frequency use status acquisition unit 104 and the second frequency use status acquired by the second frequency use status acquisition unit 105, and decides radio communication parameters in the first frequency band so as to use a frequency band used by the detected harmonic in radio communications. Details of the first radio communication parameter decision unit 106 will be described later with reference to FIGS. 15 to 24.

The first radio communication parameter decision unit 106 determines if a signal detected in a first frequency band 201 is a harmonic of a certain signal. When a signal having the second center frequency as a harmonic of a signal having the first center frequency is observed in a second frequency band 202 in association with a signal which has the first center frequency and is detected in the first frequency range 201, it can be determined that the signal having the first center frequency is an Nth harmonic of a certain signal. Conversely, when a signal having the second center frequency is not observed in the second frequency band, it can be determined that the signal having the first center frequency is not an Nth harmonic of a certain signal.

(First Embodiment)

A radio communication apparatus of this embodiment will be described below with reference to FIGS. 1 and 2.

The first frequency use status acquisition unit 104 acquires a first frequency use status of the first frequency band 201 having a first center frequency C1. The second frequency use status acquisition unit 105 acquires a second frequency use status of the second frequency band 202 having a second center frequency 2, which assumes a value M/N times (M and N are natural numbers, and M≠N) of the first center frequency. The first radio communication parameter decision unit 106 decides radio communication parameters in the first frequency band 201 using the first and second frequency use statuses.

Using the radio communication apparatus of this embodiment, whether or not a signal detected in the first frequency use status is a harmonic can be determined. As a result, by deciding the radio communication parameters in the first frequency band so as to use a frequency band including a harmonic detected in the first frequency band in cognitive radio communication, the throughput in the first frequency band can be improved.

Harmonics, and the first center frequency C1 and second center frequency C2 in FIG. 2 will be described below with reference to FIG. 3.

In general, the center frequency and band to be generated of a harmonic change depending on its order. More specifically, a kth harmonic is a signal having a center frequency and bandwidth k times those of a source signal. For example, as shown in FIG. 3, with respect to a signal 301 having a center frequency c and bandwidth b, a second harmonic 302, third harmonic 303, and fourth harmonic 304 of this signal respectively have center frequencies 2c (i.e., doubled c), 3c, and 4c, and bandwidths 2b, 3b (i.e., tripled b), and 4b.

The radio communication apparatus of this embodiment sets the center frequency of the second frequency band 202, i.e., the second center frequency C2 to be M/N times the center frequency of the first frequency band 201, i.e., the first center frequency C1. In other words, the ratio of the first to second center frequencies C1 and C2 is N:M.

A case will be exemplified with reference to FIG. 4 wherein a signal 403 is detected in the first frequency use status obtained in the first frequency band 201.

Assume that the signal 403 is an Nth harmonic of a certain signal. In this case, since the ratio of the first to second center frequencies C1 and C2 is N:M, an Mth harmonic 404 which is generated from the same source signal as a harmonic of the signal 403 is observed in the second frequency use status obtained in the second frequency band 202. More strictly, when the Nth harmonic 403 has a center frequency C1−D1, the center frequency of the Mth harmonic 404 generated from the same source signal is given by (C1−D1)×M/N. When this formula is developed using C2=C1×M/N, we have:

$$(C1 - D1) \times M/N = C1 \times M/N - D1 \times M/N = C2 - D1 \times M/N$$

That is, the Mth harmonic is observed to have a position deviated from C2 by D1×M/N as the center frequency. In this case, if M<N, the Mth harmonic invariably exists in the second frequency band 202. On the other hand, if N<M, the Mth harmonic can be observed when C2−D1×M/N does not exceed the second frequency band 202. In this manner, when a signal observed in the first frequency band 201 is the Nth harmonic of a certain signal, the Mth harmonic of the same signal is observed in the second frequency band 202. Conversely, when a signal observed in the first frequency band 201 is not the Nth harmonic of a certain signal, a signal corresponding to the Mth harmonic is not observed in the second frequency band 202.

Therefore, when a signal having a center frequency (C1−D1)×M/N is observed in the second frequency band 202 in association with a signal having a center frequency C1−D1 detected in the first frequency band 201, the first radio communication parameter decision unit 106 can determine that the signal having the center frequency C1−D1 is the Nth harmonic of a certain signal. Conversely, when a signal having the center frequency (C1−D1)×M/N is not observed in the second frequency band, the unit 106 can determine that the signal having the center frequency C1−D1 is not the Nth harmonic of a certain signal. When it can be determined that the signal is the Nth harmonic of a certain signal, the first radio communication parameter decision unit 106 sets the radio communication parameters of the first frequency band so as to use a signal band including this Nth harmonic in cognitive radio communication, thus improving the throughput in the first frequency band.

(Details of Frequency Use Status)

Details of the first frequency use status acquired by the first frequency use status acquisition unit 104 and the second frequency use status acquired by the second frequency use status acquisition unit 105 will be described below with reference to FIGS. 5, 6, 7, 8, 9, and 10. In the following description, acquisition of the first frequency use status will be explained, and a description of that of the second frequency use status will not be given since it is the same as acquisition of the first frequency use status.

Figure 5:
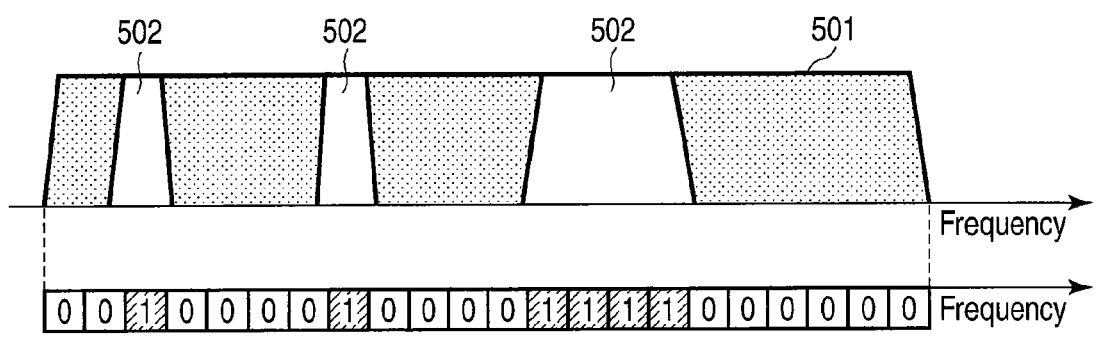
FIG. 5 to 10 are views showing examples of a first frequency use status acquired by a first frequency use status acquisition unit in FIG. 1.

FIG. 5 shows the first example of the first frequency use status. FIG. 5 shows an example of a case in which three signals 502 are detected in a first frequency band 501. Note that detection of a signal indicates a case in which a signal power in a certain band is greater than or equal to a given threshold. In the first frequency use status in the example of FIG. 5 in such state, bands are delimited to have a certain bandwidth, and each delimited band indicates the presence/absence of a signal. That is, in this example, "0" indicates the absence of a signal, and "1" indicates the presence of a signal. Using such presence/absence of a signal, the signals 502 detected in the first frequency band 501 can be expressed. The first frequency use status acquisition unit 104 acquires the presence/absence of a signal for each delimited bandwidth as the first frequency use status.

Figure 6:
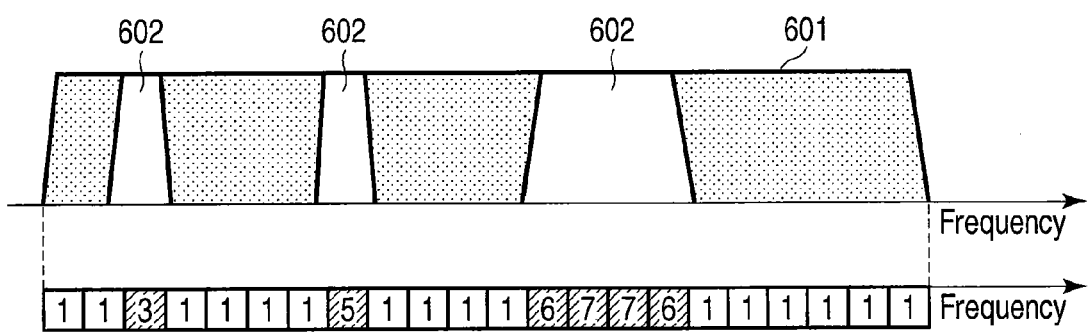

FIG. 6 shows the second example of the first frequency use status. In the example shown in FIG. 5, the first frequency use status acquisition unit 104 determines the presence/absence of a signal using a certain threshold with respect to a signal power, and generates the frequency use status based on this determination result. In the example of FIG. 6, a power value is detected for each delimited bandwidth in place of threshold determination. As the power value used in this case, the measured signal power itself or a value obtained by quantizing the signal power may be used. Clipping may be applied together with quantization. Using such power values, signals 602 detected in a first frequency band 601 can be expressed more precisely than in the example of FIG. 5. However, an information volume increases compared to the example of FIG. 5. The first frequency use status acquisition unit 104 acquires the power value of a signal for each delimited bandwidth as the first frequency use status.

Figure 7:
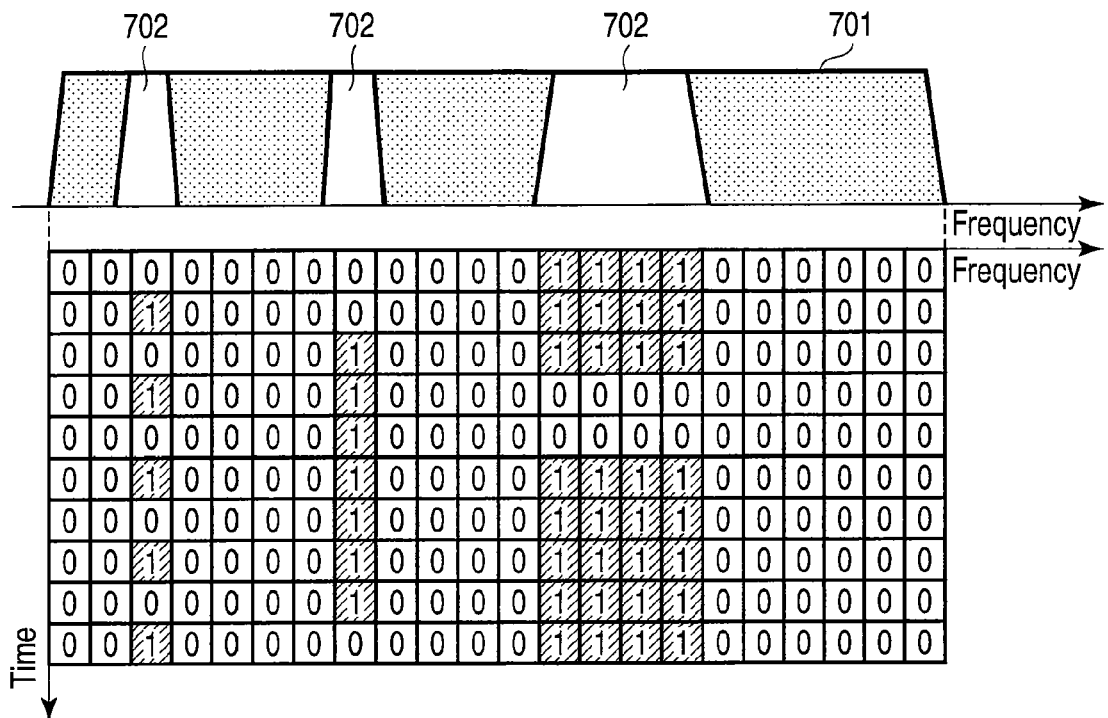
Figure 8:
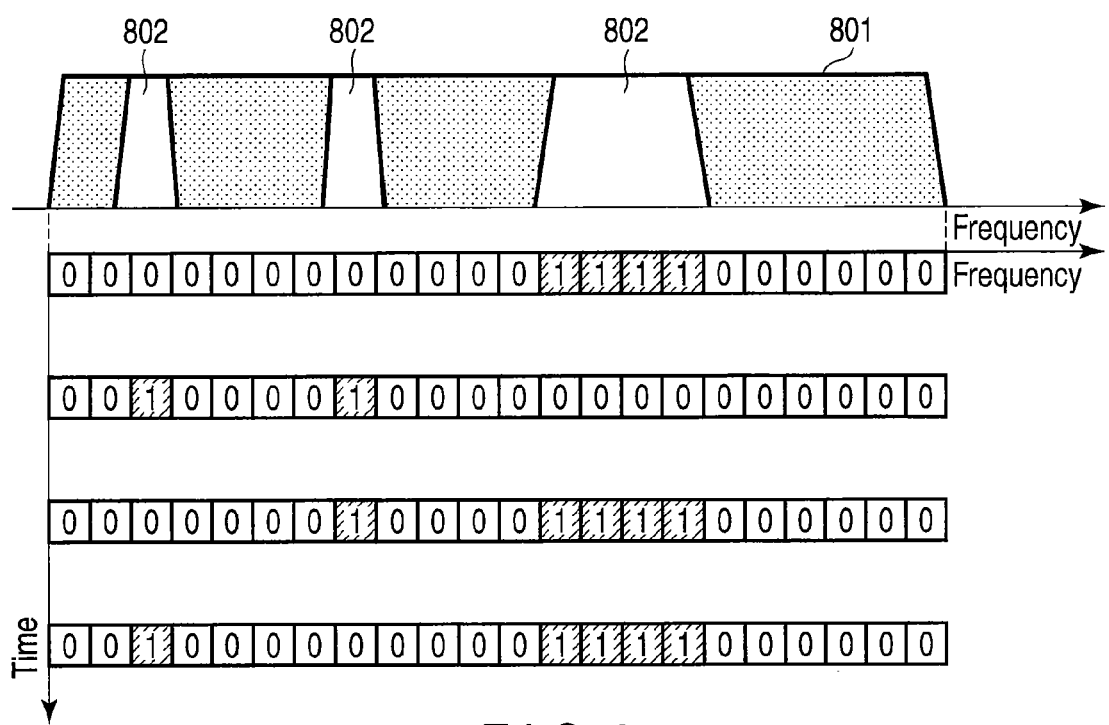

FIGS. 7 and 8 show the third example of the first frequency use status. In the example of FIG. 7, the first frequency use status acquisition unit 104 measures signals by delimiting the frequency direction into given bands as in the example shown in FIG. 5, and also measures signals by delimiting the time direction into given zones. Signal powers are measured for respective time frequency units delimited in this way, and the presence/absence of a signal is indicated by this unit. Using the frequency use status as in the example of FIG. 7, a temporal change in signal can be observed for each band. In this case, in place of observations at all the timings in FIG. 7, only the presence/absence of signals at decimated timings may be indicated, as shown in FIG. 8. In this way, the processing steps required to generate the frequency use status can be reduced.

Figure 9:
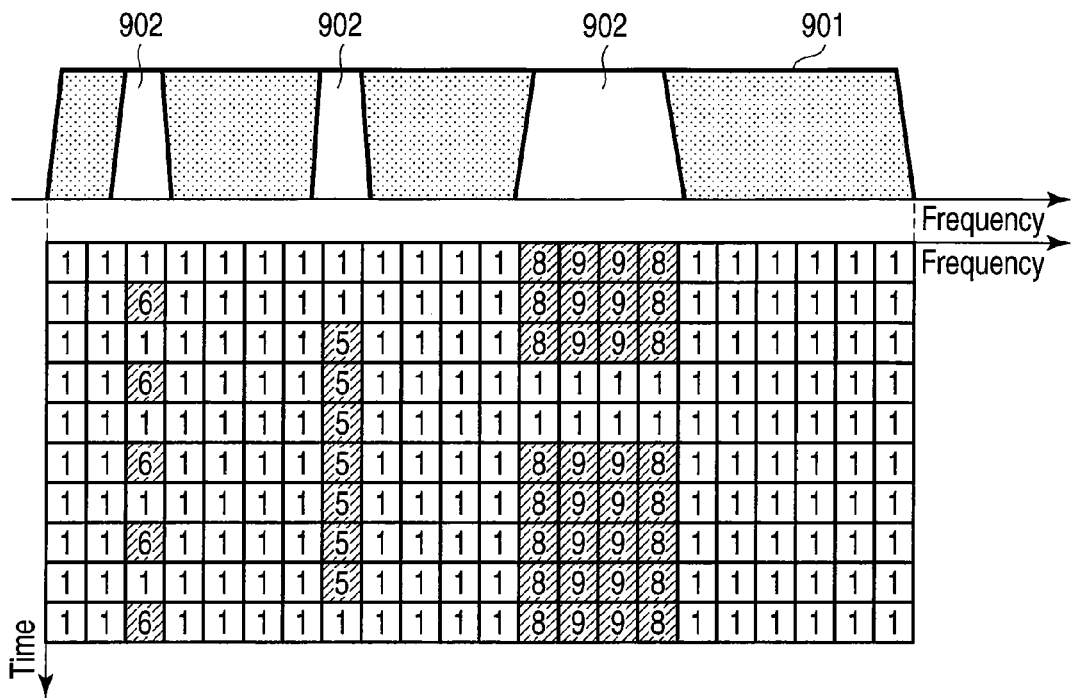
Figure 10:
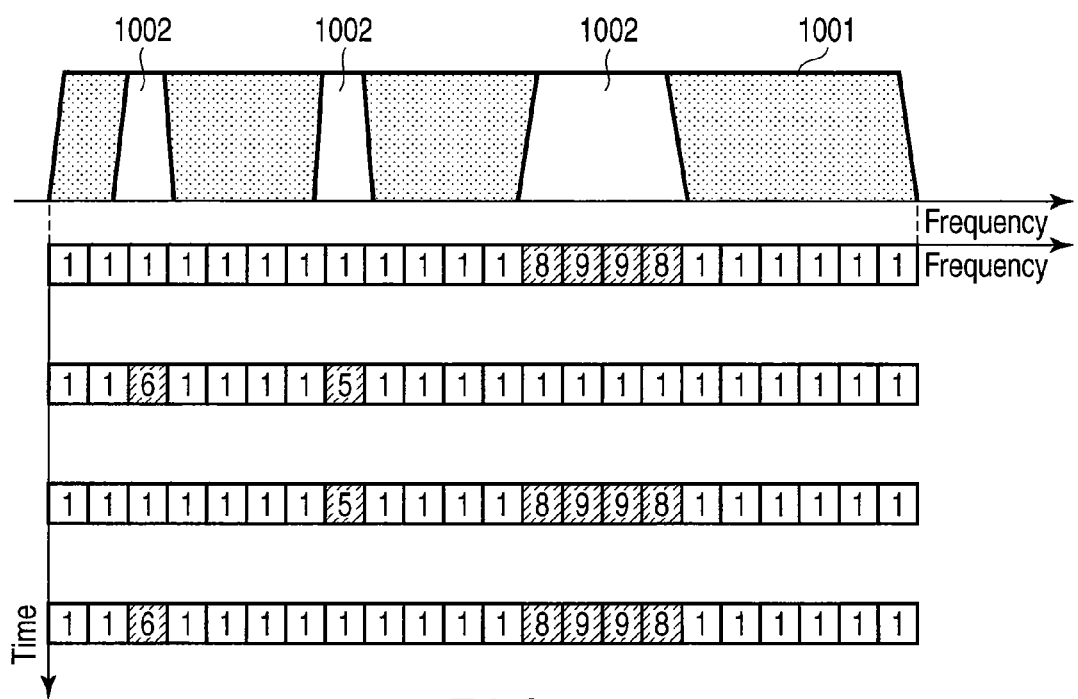

FIG. 9 shows the fourth example of the first frequency use status. As in the description of the example of FIG. 6, the example of FIG. 9 indicates signal powers for respective time frequency units with respect to FIG. 7. In this manner, signals 902 detected in a first frequency band 901 can be expressed more precisely. In this case as well, as in the example of FIG. 8, observation timings may be decimated, as shown in FIG. 10.

Details of the first and second frequency use status acquisition units 104 and 105 will be described below with reference to FIGS. 11, 12, 13, and 14. The first and second frequency use status acquisition units 104 and 105 can generate the frequency use statuses by measuring signal powers for respective frequency zones or respective time frequency zones of received signals, as described above using FIGS. 5 to 10. More specifically, the first frequency use status can be generated by receiving signals in the first frequency band and measuring their signal powers, and the second frequency use status can be generated by receiving signals in the second frequency band and measuring their signal powers.

The first and second frequency use status acquisition units 104 and 105 of the first example will be described below with reference to FIG. 11.

The first and second frequency use status acquisition units 104 and 105 respectively include signal analysis units 1101. The signal analysis unit 1101 included in the first frequency use status acquisition unit 104 acquires the first frequency use status by analyzing radio signals received in the first frequency and generating the first frequency use status. The signal analysis unit 1101 included in the second frequency use status acquisition unit 105 acquires the second frequency use status by analyzing radio signals received in the second frequency band and generating the second frequency use status.

The signal analysis unit 1101 acquires the frequency use status shown in each of FIGS. 5 to 10. That is, for example, the signal analysis unit 1101 acquires the presence/absence of a signal for each delimited bandwidth as the frequency use status, acquires the power value of a signal for each delimited bandwidth as the frequency use status, or measures signals by delimiting the frequency direction into given bands and also measures signals by delimiting the time direction into given zones.

An example of the operation of the signal analysis unit 1101 will be described below with reference to FIG. 12.

As shown in FIG. 12, in radio apparatus 1 which carries out cognitive radio communication, the signal analysis unit 1101 included in the first frequency use status acquisition unit 104 acquires the first frequency use status by analyzing radio signals received in the first frequency band and generating the first frequency use status (step S1201). Also, the signal analysis unit 1101 included in the second frequency use status acquisition unit 105 acquires the second frequency use status by analyzing radio signals received in the second frequency band and generating the second frequency use status (step S1202). In this way, the first radio communication parameter decision unit 106 included in radio apparatus 1 acquires the first and second frequency use statuses, and determines whether a signal detected in the first frequency band 201 is a harmonic of a certain signal. If a harmonic is detected, the unit 106 sets the radio communication parameters in the first frequency band so as to use a frequency band used by the detected harmonic in radio communication (step S1203).

The first and second frequency use status acquisition units 104 and 105 of the second example will be described below with reference to FIGS. 12 and 13.

In this example, the first frequency use status acquisition unit 104 includes the signal analysis unit 1101, and the second frequency use status acquisition unit 105 includes a signal demodulation unit 1301. The signal demodulation unit 1301 receives the second frequency use status from another radio communication apparatus. The radio unit 103 receives a modulated signal including the second frequency use status, and the signal demodulation unit 1301 demodulates this modulated signal to acquire the second frequency use status. In this example, the first frequency use status acquisition unit 104 includes the signal analysis unit 1101, and the second frequency use status acquisition unit 105 includes the signal demodulation unit 1301. Alternatively, the first frequency use status acquisition unit 104 may include the signal demodulation unit 1301, and the second frequency use status acquisition unit 105 may include the signal analysis unit 1101.

An example of the operation of the signal demodulation unit 1301 will be described below with reference to FIG. 13.

As shown in FIG. 14, in radio apparatus 1 which carries out cognitive radio communication, the signal analysis unit 1101 included in the first frequency use status acquisition unit 104 acquires the first frequency use status by analyzing radio signals received in the first frequency band and generating the first frequency use status (step S1201). On the other hand, in radio apparatus 2 which carries out cognitive radio communication with radio apparatus 1, the signal analysis unit 1101 included in the second frequency use status acquisition unit 105 generates the second frequency use status by analyzing radio signals received in the second frequency band (step S1202), and the radio unit 103 transmits a signal including the second frequency use status to radio apparatus 1 (step S1401). In radio apparatus 1, the radio unit 103 receives the second frequency use status transmitted from radio apparatus 2, and the signal demodulation unit 1301 demodulates this received signal to acquire the second frequency use status (step S1402). With this processing as well, radio apparatus 1 can acquire the first and second frequency use statuses (step S1203).

When the method shown in FIG. 12 is adopted, radio apparatus 1 has to analyze signals in both the first and second frequency bands. On the other hand, when the method shown in FIG. 14 is adopted, radio apparatus 1 need only analyze signals in the first frequency band. That is, when radio apparatus 2 as a cognitive radio communication partner exists, and generates the second frequency use status, it transmits that frequency use status to radio apparatus 1, thus removing the need of analyzing signals in the second frequency band by radio apparatus 1. However, when radio apparatus 2 does not generate any second frequency use status, radio apparatus 1 also has to analyze signals in the second frequency band as in the example of FIG. 12.

The first operation example of the first radio communication parameter decision unit 106 will be described below with reference to FIGS. 15, 16, 17, 18, 19, and 20. The first radio communication parameter decision unit 106 detects a certain harmonic in the first frequency band using the first and second frequency use statuses. The unit 106 may decide the radio communication parameters in the first frequency band so as to use a frequency band used by the detected harmonic in radio communication.

When a frequency band including a frequency f in the first frequency band is used, and a frequency band including a frequency f×M/N in the second frequency band is used, the first radio communication parameter decision unit 106 determines the frequency band including the frequency f as a harmonic.

This processing will be described below taking as an example a case in which the first frequency use status of the first frequency use acquisition unit 104 is obtained, as shown in FIG. 15, and N=2 and M=1. Since N=2 and M=1, when a signal band 1501 detected in the first frequency band is a second harmonic, a source signal of that harmonic is observed in the second frequency band, and the second frequency use status acquisition unit 105 obtains a second frequency use status, as shown in FIG. 16. Therefore, if the first frequency use status shown in FIG. 15 and the second frequency use status including a signal band 1601 shown in FIG. 16 are obtained, the first radio communication parameter decision unit 106 can determine the signal band 1501 detected in the first frequency use status as the second harmonic.

Figure 17:
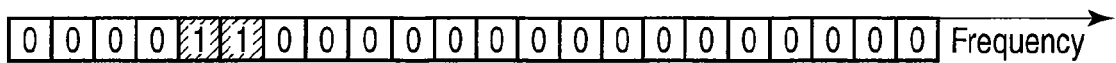

On the other hand, if the first frequency use status shown in FIG. 15 and a second frequency use status shown in FIG. 17 are obtained, since a signal corresponding to the signal band 1501 cannot be detected in the second frequency use status, the first radio communication parameter decision unit 106 can determine that a signal corresponding to the signal band 1501 is not a second harmonic. In the example described so far, the case has been described wherein the frequency use statuses are expressed by the method described using FIG. 5.

Figure 18:
Figure 19:
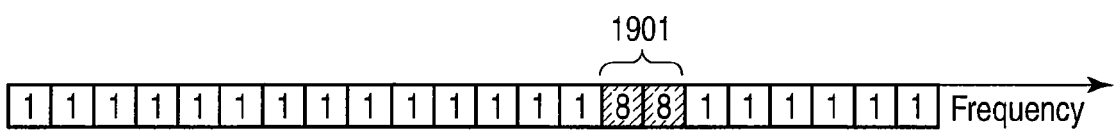
Figure 20:
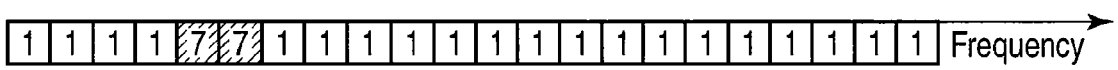

When the frequency use statuses are expressed by the method described using FIG. 6, the basic operation remains the same. That is, if a second frequency use status including a signal band 1901 corresponding to a signal band 1801 is obtained, as shown in FIG. 19, with respect to the signal band 1801 detected as a high signal power region in a first frequency use status, which is given, as shown in FIG. 18, the first radio communication parameter decision unit 106 determines the signal band 1801 as a second harmonic. On the other hand, if the second frequency use status does not include any signal band corresponding to the signal band 1801, as shown in FIG. 20, the unit 106 determines that the signal band 1801 is not a second harmonic.

The second operation example of the first radio communication parameter decision unit 106 will be described below with reference to FIGS. 21, 22, 23, and 24.

The first operation example of the first radio communication parameter decision unit 106 has explained the case in which the frequency use statuses having only information in the frequency direction are used. The second operation example will explain a case in which frequency use statuses which also include information in the time direction, i.e., those which are generated by the methods described using FIGS. 7, 8, 9, and 10 are used.

When a time zone and frequency band which include a time t and frequency f in the first frequency band are used, and a time zone and frequency band which include the time t and a frequency f×M/N in the second frequency band are used, the first radio communication parameter decision unit 106 determines the frequency band including the frequency f as a harmonic.

This processing will be explained below taking as an example a case in which the first frequency use status is obtained, as shown in FIG. 21, and N=2 and M=1. Since N=2 and M=1, when a signal band 2101 detected in the first frequency band is a second harmonic, a source signal of that harmonic is observed in the second frequency band. Upon checking temporal changes of signals detected in the respective frequency bands, they are synchronized with each other. This is because when the source signal disappears, the second harmonic also disappears. Therefore, when the first frequency use status shown in FIG. 21 and a second frequency use status shown in FIG. 22 are obtained, i.e., when the frequency relationship meets M/N, and detected signal bands are temporally synchronized, the signal band 2101 detected in the first frequency use status can be determined as a second harmonic.

Figure 23:
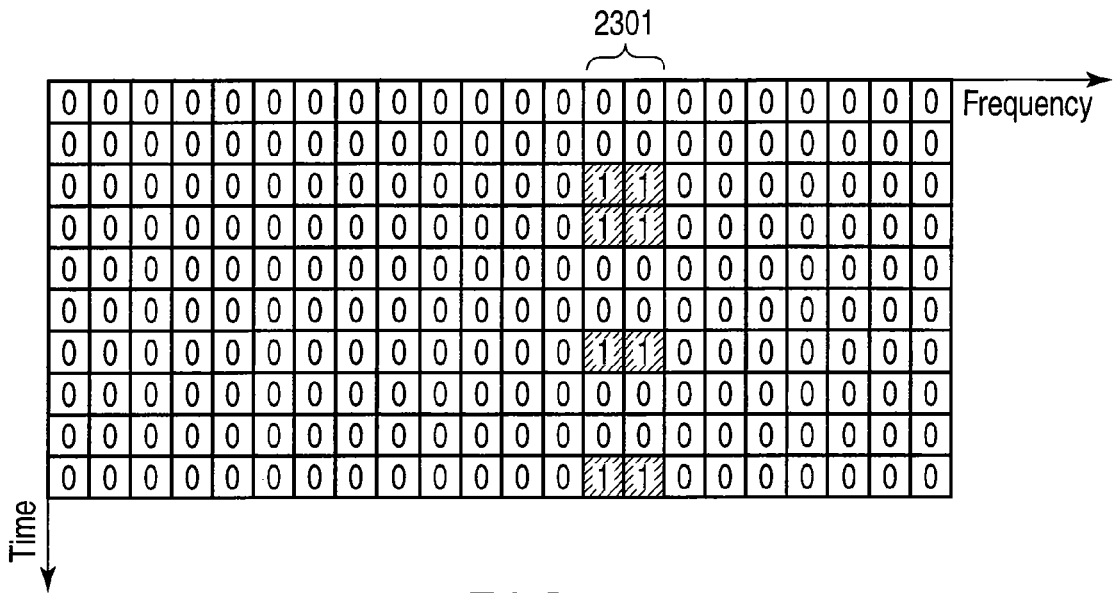
Figure 24:
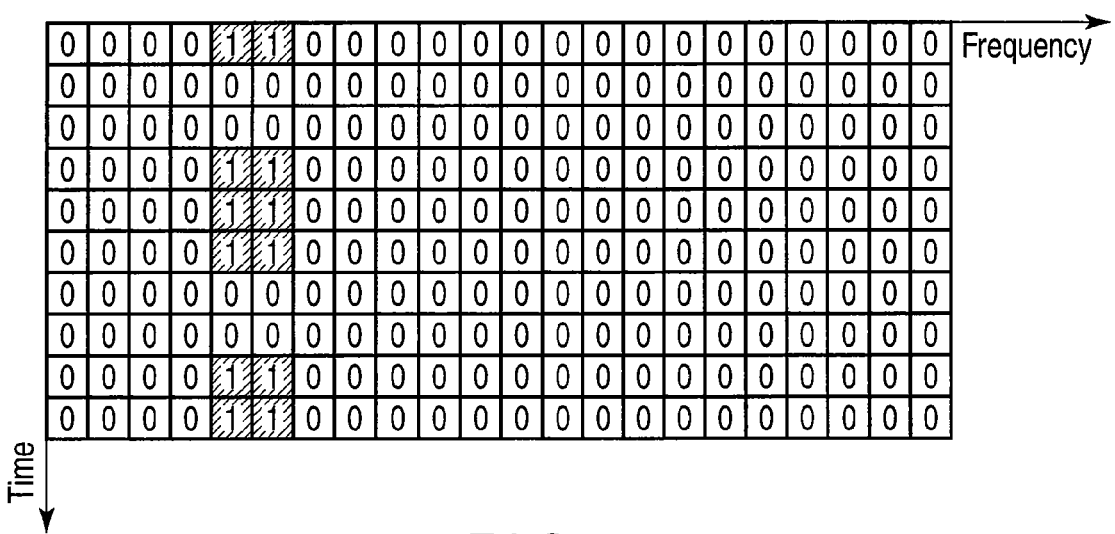

On the other hand, when the first frequency use status shown in FIG. 21 and a second frequency use status shown in FIG. 23 are obtained, i.e., when the frequency relationship meets M/N but detected signal bands are not temporally synchronized, the first radio communication parameter decision unit 106 can determine that the signal band 2101 detected in the first frequency use status is not a second harmonic. As can be seen from the above description, when a second frequency use status shown in FIG. 24 is obtained, the first radio communication parameter decision unit 106 can also determine that the signal band 2101 detected in the first frequency use status is not a second harmonic.

The second center frequency setting method used when radio apparatus 1 generates the first and second frequency use statuses will be described below with reference to FIG. 25.

In this embodiment, the second center frequency has to assume a value M/N times (M and N are natural numbers, and M≠N) of the first center frequency. Upon starting cognitive radio communication, when the second center frequency does not assume this value, the center frequency setting unit 101 has to change the second center frequency to a desired value. More specifically, prior to generation of the frequency use statuses in steps S2502 and S2503 in FIG. 25, the second center frequency has to be set to be a desired value in step S2501. FIG. 25 exemplifies a case in which the second center frequency is set to be a value M/N times the first center frequency. In this way, the second center frequency can be set to be an appropriate value before generation of the frequency use statuses.

After harmonic determination using the frequency use statuses, the second center frequency can be changed to another value. If a harmonic is detected in step S2504, and the presence/absence of a harmonic is settled in step S2505, the second center frequency may be changed to another value in step S2507. In this case, for example, the second center frequency may be changed to a band including the smaller number of signals by existing radio communication systems. Note that settlement of the presence/absence of a harmonic in step S2505 means, for example, a case in which the presence/absence of a harmonic is not settled when the signal power of a harmonic detected in step S2504 is, e.g., small, and that signal is settled as a harmonic only after a plurality of repetitive detections. In FIG. 25, the order of steps S2506 and S2507 may be reversed. In this case as well, the same effect can be obtained. When the second center frequency is not changed, step S2507 is skipped.

Figure 26:
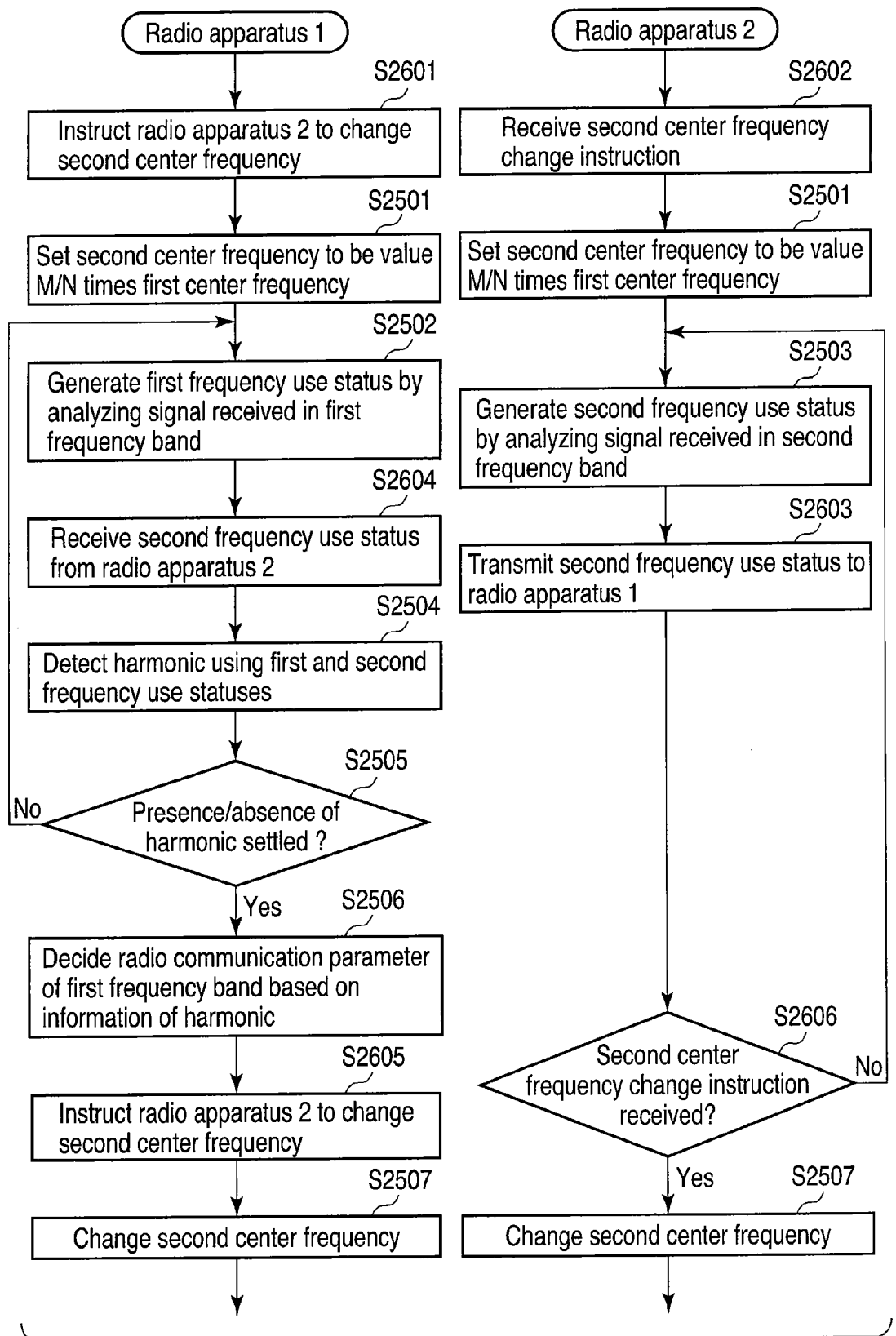

The second center frequency setting method used when radio apparatus 1 generates the first frequency use status and radio apparatus 2 generates the second frequency use status will be described below with reference to FIG. 26.

Figure 25:
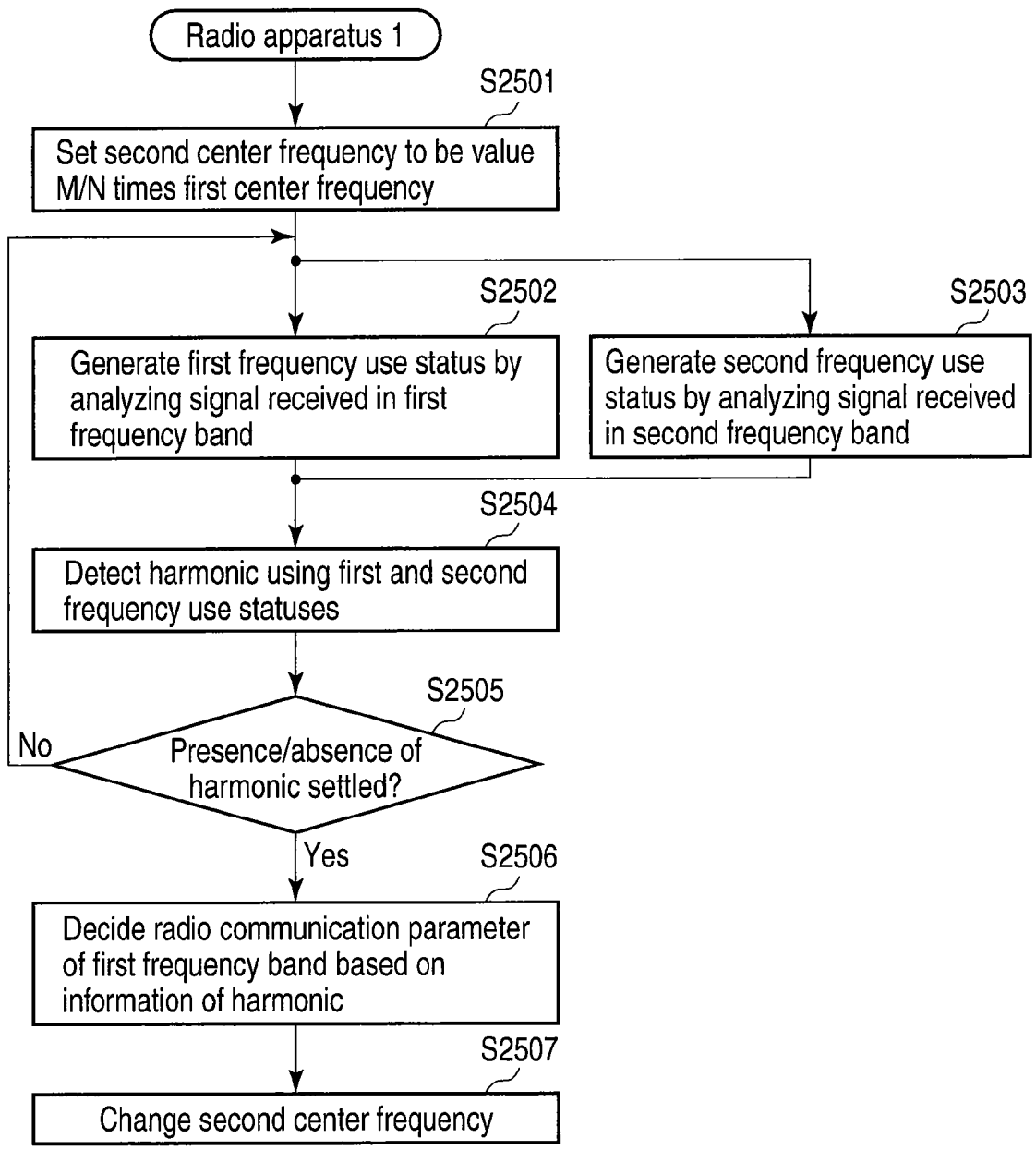
FIGS. 25 to 26 are flowcharts showing examples of the second center frequency setting method executed by a center frequency setting unit in FIG. 1.

As in the description of FIG. 25, when the second center frequency does not assume a desired value, the second center frequency has to be changed to a desired value before measurement of the frequency use statuses. Hence, before measurement of the frequency use statuses in steps S2502 and S2503, the second center frequency is changed in steps S2601, S2602, and S2501. That is, radio apparatus 1 instructs radio apparatus 2 to change the second center frequency in step S2601, and radio apparatus 2 receives the second center frequency change instruction from radio apparatus 1 in step S2602. After that, each of radio apparatuses 1 and 2 changes the second center frequency to a desired value in step S2501. FIG. 26 exemplifies a case in which the second center frequency is set to be a value M/N times the first center frequency based on the first embodiment. In this way, the second center frequency can be set to be an appropriate value before generation of the frequency use statuses.

As in the example of FIG. 25, after harmonic determination using the frequency use statuses, the second center frequency may be changed to another value. For example, after the presence/absence of a harmonic is settled in step S2505, radio apparatus 1 may instruct radio apparatus 2 to change the second center frequency in step S2605, radio apparatus 2 may receive the second center frequency change instruction transmitted from radio apparatus 1 in step S2606, and each of radio apparatuses 1 and 2 may change the second center frequency to another value in step S2507. If the second center frequency is not changed, steps S2605, S2606, S2507, and S2507 are skipped.

According to the aforementioned first embodiment, when it can be determined that a signal included in the first frequency band is an Nth harmonic of a certain signal, the first radio communication parameter decision unit 106 sets the radio communication parameters of the first frequency band so as to use a signal band including this Nth harmonic in cognitive radio communication, thus improving the throughput in the first frequency band.

(Second Embodiment)

A radio communication apparatus of this embodiment will be described below with reference to FIGS. 27, 28, and 29. In the first and second embodiments, only the operation of the center frequency setting unit 101 is different.

The first frequency use status acquisition unit 104 obtains a first frequency use status of a first frequency band which has a first center frequency and first bandwidth W1. The second frequency use status acquisition unit 105 obtains a second frequency use status of a second frequency band which has a second center frequency which falls within the range of $\pm MAX(0,(W2-W1\times M/N)/2)$ using a value M/N times (M and N are natural numbers, and M≠N) of the first center frequency as the center, and a second bandwidth W2. The first radio communication parameter decision unit 106 decides radio communication parameters in the first frequency band using the first and second frequency use statuses.

In the radio communication apparatus of this embodiment, the second center frequency setting method is different from the first embodiment. More specifically, in the first embodiment, the second center frequency is set to be a value M/N times the first center frequency. However, in this embodiment, the second center frequency is selected from values within the range of $\pm MAX(0,(W2-W1\times M/N)/2)$ using a value M/N times the first center frequency as the center. In formula $MAX(0,(W2-W1\times M/N)/2)$, the first value is "0". That is, this formula returns a value "$(W2-W1\times M/N)/2$" when the value $(W2-W1\times M/N)/2$ is greater than or equal to "0" or returns "0" when the value $(W2-W1\times M/N)/2$ is less than "0".

The effect obtained when the value to be set as the second center frequency has a range in this way will be described below. As described above, a kth harmonic has a center frequency and frequency bandwidth k times those of a source signal. Therefore, for example, as shown in FIG. 27, an Mth harmonic which is detected in a second frequency band 2702 with respect to an arbitrary Nth harmonic that may exist in a first frequency band 2701 is detected only within a range 2703 which has a center frequency $C1\times M/N$ as the center and has a bandwidth $W1\times M/N$. In other words, the Mth harmonic corresponding to the arbitrary Nth harmonic that may exist in the first frequency band 2701 is never detected outside the band 2703. For this reason, when the second frequency band 2702 is set to have a range including the band 2703, the Mth harmonic can be detected using the second frequency use status in this second frequency band.

Figure 28:
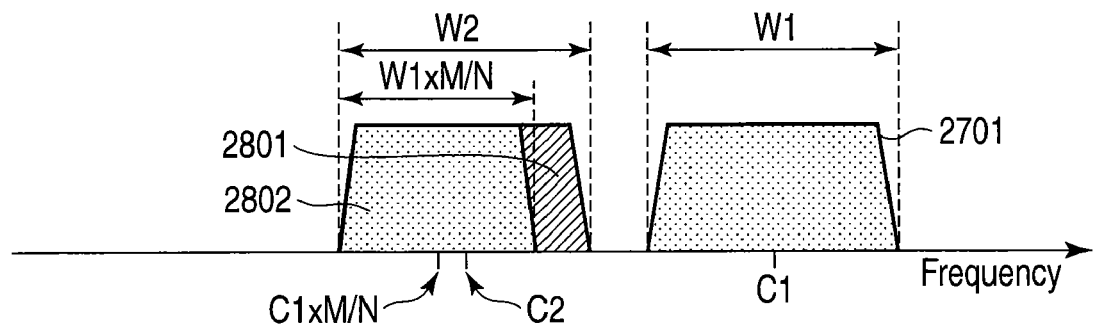

Upon setting the second center frequency to include a range in which the Mth harmonic is likely to exist, if the frequency is shifted in, e.g., the positive direction, the center frequency can be shifted up to $C1\times M/N+(W2-W1\times M/N)/2$, as shown in FIG. 28. On the other hand, if the frequency is shifted in, e.g., the negative direction, the center frequency can be shifted up to $C1\times M/N-(W2-W1\times M/N)/2$, as shown in FIG. 29. Even when the second center frequency value is set to fall within this range, the Nth harmonic in the first frequency band can be determined as in the first embodiment, and the throughput can be consequently improved. In the second embodiment, since the second center frequency can be set within a given range, the following effect can be obtained in addition to these effects.

Figure 27:
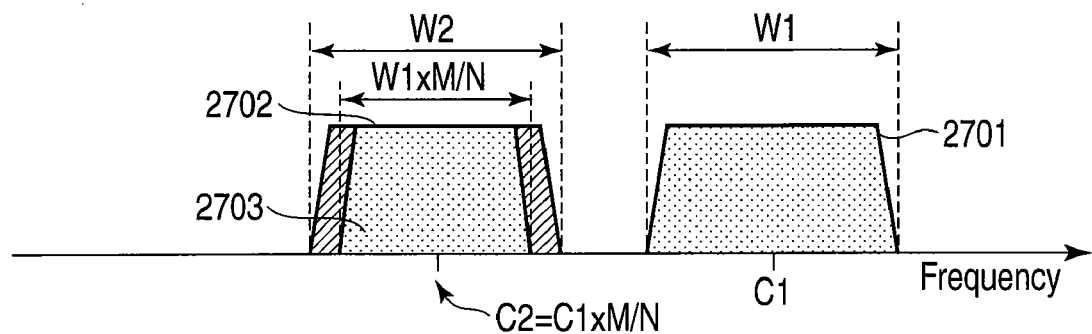
FIGS. 27 to 29 are views for explaining the operation of a center frequency setting unit of a radio communication apparatus according to the second embodiment.

For example, when an existing communication system is carrying out communication on the immediate left side of the band 2703 in FIG. 27, since a band available for cognitive radio communication in the second frequency band is reduced, the throughput in the second frequency band often lowers. In such case, by shifting the second frequency band in the positive direction, as shown in FIG. 28, an overlap between the second frequency band and existing communication system can be reduced, and the throughput of the cognitive radio communication in the second frequency band can be consequently improved.

Figure 29:
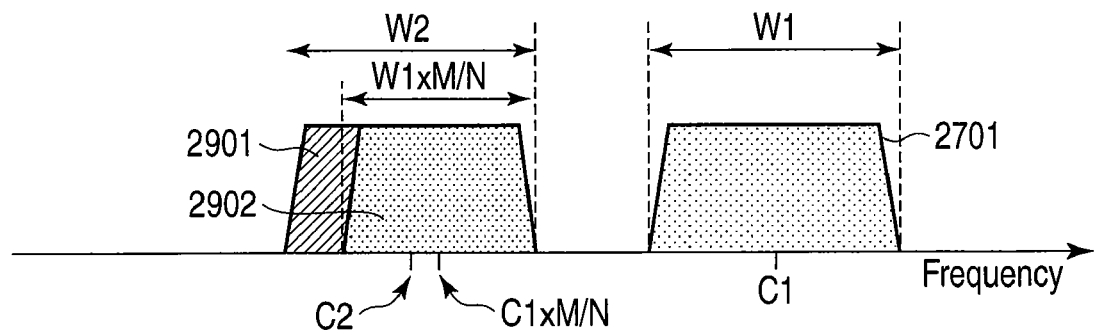

Conversely, when an existing communication system is carrying out communication on the immediate right side of the band 2703 in FIG. 27, the second frequency band is shifted in the negative direction, as shown in FIG. 29, so as to reduce an overlap between the second frequency band and existing communication system, and the throughput of the cognitive radio communication in the second frequency band can be consequently improved.

The second center frequency setting method set by the center frequency setting unit 101 will be described below with reference to FIG. 25.

In the second embodiment, the second center frequency has to falls within the range of $\pm MAX(0, (W2-W1\times M/N)/2)$ using a value M/N times (M and N are natural numbers, and M≠N) of the first center frequency. Upon starting cognitive radio communication, if the second center frequency does not assume this value, the second frequency has to be changed to a desired value. More specifically, prior to generation of the frequency use statuses in steps S2502 and S2503 in FIG. 25, the second center frequency has to be set to be a desired value in step S2501. FIG. 25 exemplifies a case in which the second center frequency is set to be a value M/N times the first center frequency based on the first embodiment. In case of the second embodiment as well, this operation is basically the same. In this manner, before generation of the frequency use statuses, the second center frequency can be set to be an appropriate value.

After harmonic determination using the frequency use statuses, the second center frequency can be changed to another value. For example, after harmonic detection is made in step S2504, and the presence/absence of a harmonic is settled in step S2505, the second center frequency may be changed to another value in step S2507. In this case, for example, the second center frequency may be changed to a band including the smaller number of signals by existing radio communication systems. Note that settlement of the presence/absence of a harmonic in step S2505 means, for example, a case in which the presence/absence of a harmonic is not settled when the signal power of a harmonic detected in step S2504 is, e.g., small, and that signal is settled as a harmonic only after a plurality of repetitive detections. In FIG. 25, the order of steps S2506 and S2507 may be reversed. In this case as well, the same effect can be obtained. If the second center frequency is not changed, step S2507 is skipped.

According to the aforementioned second embodiment, in addition to the effects of the first embodiment, when an existing communication system is carrying out communication in a band near the second frequency band, since the second frequency band can be shifted to avoid a use band of that communication system by shifting the second center frequency of the second frequency band up to $C1 \times M/N + (W2 - W1 \times M/N)/2$, the throughput of cognitive radio communication in the second frequency band can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus comprising:
a first acquisition unit configured to acquire a first frequency use status of a first frequency band having a first center frequency;
a second acquisition unit configured to acquire a second frequency use status of a second frequency band having a second center frequency which is a value M/N times (M and N are natural numbers, and M≠N) of the first center frequency; and
a decision unit configured to determine whether a harmonic is detected in the first frequency band using the first frequency use status and the second frequency use status, to decide, if it is determined that the harmonic is detected, a radio communication parameter in the first frequency band so as to use a frequency band used by the harmonic in radio communication, and to set the second center frequency to be the value M/N times the first center frequency.

2. The apparatus according to claim 1, wherein the first acquisition unit acquires, as the first frequency use status, first information of first frequency bands used within the first frequency band depending on whether or not a first value calculated from a first radio signal received in the first frequency band is not less than a first threshold, and
the second acquisition unit acquires, as the second frequency use status, second information of second frequency bands used within the second frequency band depending on whether or not a second value calculated from a second radio signal received in the second frequency band is not less than a second threshold.

3. The apparatus according to claim 2, wherein the first acquisition unit acquires, as the first information, the first frequency bands and first signal power values of the first frequency bands, and
the second acquisition unit acquires, as the second information, the second frequency bands and second signal power values of the second frequency bands.

4. The apparatus according to claim 1, further comprising a reception unit configured to receive a radio signal, and
wherein the first acquisition unit acquires, as the first frequency use status, first information of first frequency bands used within the first frequency band depending on whether or not a first value calculated from a first radio signal received in the first frequency band is not less than a first threshold, and
the second acquisition unit acquires, if the reception unit receives third information of third frequency bands which are used in the second frequency band and are acquired by a radio communication partner, the third information as the second frequency use status.

5. The apparatus according to claim 4, wherein the first acquisition unit acquires, as the first information, the first frequency bands and first signal power values of the first frequency bands, and
the second acquisition unit acquires, as the second information, the second frequency bands and second signal power values of the second frequency bands.

6. The apparatus according to claim 1, wherein the first acquisition unit acquires, as the first frequency use status, fourth information of first time zones and fourth frequency bands, which are used in the first frequency band, depending on whether or not a first value calculated from a first radio signal received in the first frequency band is not less than a first threshold, and
the second acquisition unit acquires, as the second frequency use status, fifth information of second time zones and fifth frequency bands, which are used in the second frequency band, depending on whether or not a second value calculated from a second radio signal received in the second frequency band is not less than a second threshold.

7. The apparatus according to claim 6, wherein the first acquisition unit acquires, as the fourth information, the first time zones and the fourth frequency bands, and third signal power values corresponding to the first time zones and the fourth frequency bands, and
the second acquisition unit acquires, as the fifth information, the second time zones and the fifth frequency bands, and fourth signal power values corresponding to the second time zones and the fifth frequency bands.

8. The apparatus according to claim 1, further comprising a reception unit configured to receive a radio signal, and
wherein the first acquisition unit acquires, as the first frequency use status, fourth information of first time zones and fourth frequency bands, which are used in the first frequency band, depending on whether or not a first value calculated from a first radio signal received in the first frequency band is not less than a first threshold, and
the second acquisition unit acquires, if the reception unit receives fifth information of second time zones and fifth frequency bands which are used in the second frequency band and are acquired by a radio communication partner, the fifth information as second frequency use status.

9. The apparatus according to claim 8, wherein the first acquisition unit acquires, as the fourth information, the first time zones and the fourth frequency bands, and the third signal power values, and
the second acquisition unit acquires, as the fifth information, the second time zones and the fifth frequency bands, and fourth signal power values corresponding to the second time zones and the fifth frequency bands.

10. The apparatus according to claim 1, wherein if a sixth frequency band including a frequency f in the first frequency band is used, and if a seventh frequency band including a frequency f×M/N in the second frequency band is used, the decision unit detects the sixth frequency band as a harmonic.

11. The apparatus according to claim 1, wherein if a third time zone and a sixth frequency band which respectively include a time and a frequency f in the first frequency band are used, and if a fourth time zone and a seventh frequency band which respectively include a time and a frequency f×M/N in the second frequency band are used, the decision unit detects the sixth frequency band as a harmonic.

12. The apparatus according to claim 1, further comprising a setting unit configured to set, if a third center frequency included in the second frequency band is not a value M/N times (M and N are natural numbers, and M≠N) of the first center frequency, the third center frequency to a value M/N times the first center frequency as the second center frequency.

13. The apparatus according to claim 1, further comprising a change unit configured to change the second center frequency to another value after the decision unit decides the radio communication parameter in the first frequency band.

14. A radio communication apparatus comprising:
a first acquisition unit configured to acquire a first frequency use status of a first frequency band having a first center frequency and a first bandwidth W1;
a second acquisition unit configured to acquire a second frequency use status of a second frequency band having a second center frequency which falls within a range of ±MAX(0, (W2−W1×M/N)/2) using a value M/N times (M and N are natural numbers, and M≠N) of the first center frequency as a center, and having a second bandwidth W2; and
a decision unit configured to determine whether a harmonic is detected in the first frequency band using the first frequency use status and the second frequency use status, to decide, if it is determined that the harmonic is detected, a radio communication parameter in the first frequency band so as to use a frequency band used by the harmonic in radio communication, and to set the second center frequency to be the value M/N times the first center frequency.

15. The apparatus according to claim 14, wherein the first acquisition unit acquires, as the first frequency use status, first information of first frequency bands used within the first frequency band depending on whether or not a first value calculated from a first radio signal received in the first frequency band is not less than a first threshold, and
the second acquisition unit acquires, as the second frequency use status, second information of second frequency bands used within the second frequency band depending on whether or not a second value calculated from a second radio signal received in the second frequency band is not less than a second threshold.

16. The apparatus according to claim 15, wherein the first acquisition unit acquires, as the first information, the first frequency bands and first signal power values of the first frequency bands, and
the second acquisition unit acquires, as the second information, the second frequency bands and second signal power values of the second frequency bands.

17. The apparatus according to claim 14, further comprising a reception unit configured to receive a radio signal, and
wherein the first acquisition unit acquires, as the first frequency use status, first information of first frequency bands used within the first frequency band depending on whether or not a first value calculated from a first radio signal received in the first frequency band is not less than a first threshold, and
the second acquisition unit acquires, if the reception unit receives third information of third frequency bands which are used in the second frequency band and are acquired by a radio communication partner, the third information as the second frequency use status.

18. The apparatus according to claim 17, wherein the first acquisition unit acquires, as the first information, the first frequency bands and first signal power values of the first frequency bands, and
the second acquisition unit acquires, as the second information, the second frequency bands and second signal power values of the second frequency bands.

19. The apparatus according to claim 14, wherein the first acquisition unit acquires, as the first frequency use status, fourth information of first time zones and fourth frequency bands, which are used in the first frequency band, depending on whether or not a first value calculated from a first radio signal received in the first frequency band is not less than a first threshold, and
the second acquisition unit acquires, as the second frequency use status, fifth information of second time zones and fifth frequency bands, which are used in the second frequency band, depending on whether or not a second value calculated from a second radio signal received in the second frequency band is not less than a second threshold.

20. The apparatus according to claim 19, wherein the first acquisition unit acquires, as the fourth information, the first time zones and the fourth frequency bands, and third signal power values corresponding to the first time zones and the fourth frequency bands, and
the second acquisition unit acquires, as the fifth information, the second time zones and the fifth frequency bands, and fourth signal power values corresponding to the second time zones and the fifth frequency bands.

21. The apparatus according to claim 14, further comprising a reception unit configured to receive a radio signal, and
wherein the first acquisition unit acquires, as the first frequency use status, fourth information of first time zones and fourth frequency bands, which are used in the first frequency band, depending on whether or not a first value calculated from a first radio signal received in the first frequency band is not less than a first threshold, and
the second acquisition unit acquires, if the reception unit receives fifth information of second time zones and fifth frequency bands which are used in the second frequency band and are acquired by a radio communication partner, the fifth information as second frequency use status.

22. The apparatus according to claim 21, wherein the first acquisition unit acquires, as the fourth information, the first time zones and the fourth frequency bands, and the third signal power values, and
the second acquisition unit acquires, as the fifth information, the second time zones and the fifth frequency bands, and fourth signal power values corresponding to the second time zones and the fifth frequency bands.

23. The apparatus according to claim 14, wherein if a sixth frequency band including a frequency f in the first frequency band is used, and if a seventh frequency band including a frequency f×M/N in the second frequency band is used, the decision unit detects the sixth frequency band as a harmonic.

24. The apparatus according to claim 14, wherein if a third time zone and a sixth frequency band which respectively include a time and a frequency f in the first frequency band are used, and if a fourth time zone and a seventh frequency band which respectively include a time and a frequency f×M/N in the second frequency band are used, the decision unit detects the sixth frequency band as a harmonic.

25. The apparatus according to claim 14, further comprising a setting unit configured to set, if a third center frequency included in the second frequency band does not fall within a range of ±W×(1−M/N)/2 using a value M/N times (M and N are natural numbers, and M<N) of the first center frequency as the center, the third center frequency which falls within a range of ±MAX(0, (W2−W1×M/N)/2) using a value M/N times of the first center frequency as the center.

26. The apparatus according to claim 14, further comprising a change unit configured to change the second center frequency to another value after the decision unit decides the radio communication parameter in the first frequency band.

27. A radio communication method comprising:
acquiring a first frequency use status of a first frequency band having a first center frequency;
acquiring a second frequency use status of a second frequency band having a second center frequency;
setting the second center frequency to a value M/N times (M and N are natural numbers, and M≠N) of the first center frequency;
determining whether a harmonic is detected in the first frequency band using the first frequency use status and the second frequency use status; and
deciding, if it is determined that the harmonic is detected, a radio communication parameter in the first frequency band so as to use a frequency band used by the harmonic in radio communication.

28. A radio communication method comprising:
acquiring a first frequency use status of a first frequency band having a first center frequency and a first bandwidth W1;
acquiring a second frequency use status of a second frequency band having a second center frequency;
setting the second center frequency to a range of ±MAX(0, (W2−W1×M/N)/2) using a value M/N times (M and N are natural numbers, and M≠N) of the first center frequency as a center, and having a second bandwidth W2;
determining whether a harmonic is detected in the first frequency band using the first frequency use status and the second frequency use status; and
deciding, if it is determined that the harmonic is detected, a radio communication parameter in the first frequency band so as to use a frequency band used by the harmonic in radio communication.

* * * * *

UNITED STATES PATENT AND TRADEMARK OFFICE
CERTIFICATE OF CORRECTION

PATENT NO. : 8,175,558 B2
APPLICATION NO. : 12/396190
DATED : May 8, 2012
INVENTOR(S) : Akita et al.

Page 1 of 1

It is certified that error appears in the above-identified patent and that said Letters Patent is hereby corrected as shown below:

Title page, Item (73):

Please add Name of Assignee: Kabushiki Kaisha Toshiba
Please add Residence: Minato-ku, Tokyo, Japan Signed and Sealed this
Nineteenth Day of February, 2013

Teresa Stanek Rea
*Acting Director of the United States Patent and Trademark Office*